J. AUSUCUA.
COFFEE, TEA, AND MILK URN.
APPLICATION FILED MAR. 6, 1917.
1,256,424.
Patented Feb. 12, 1918.
2 SHEETS—SHEET 1.
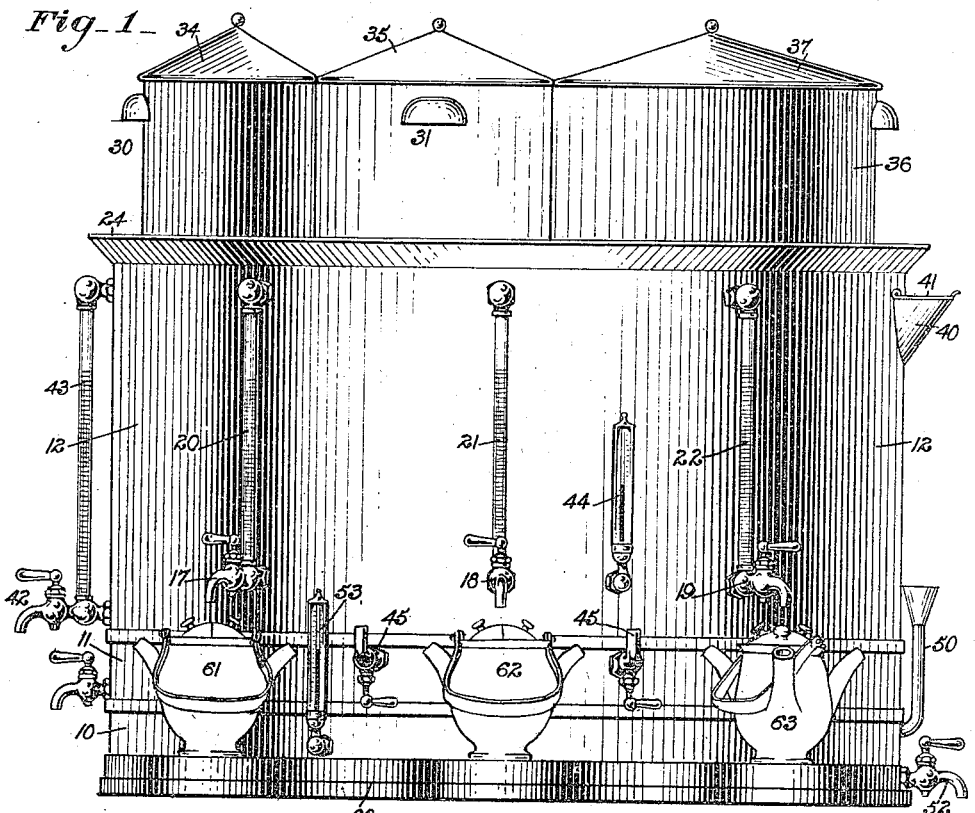
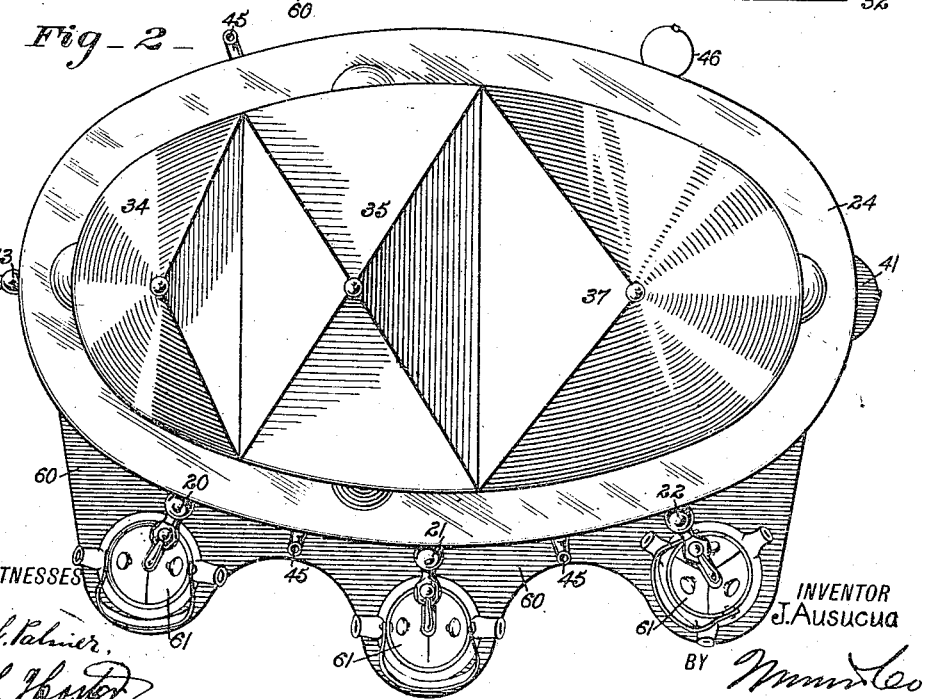

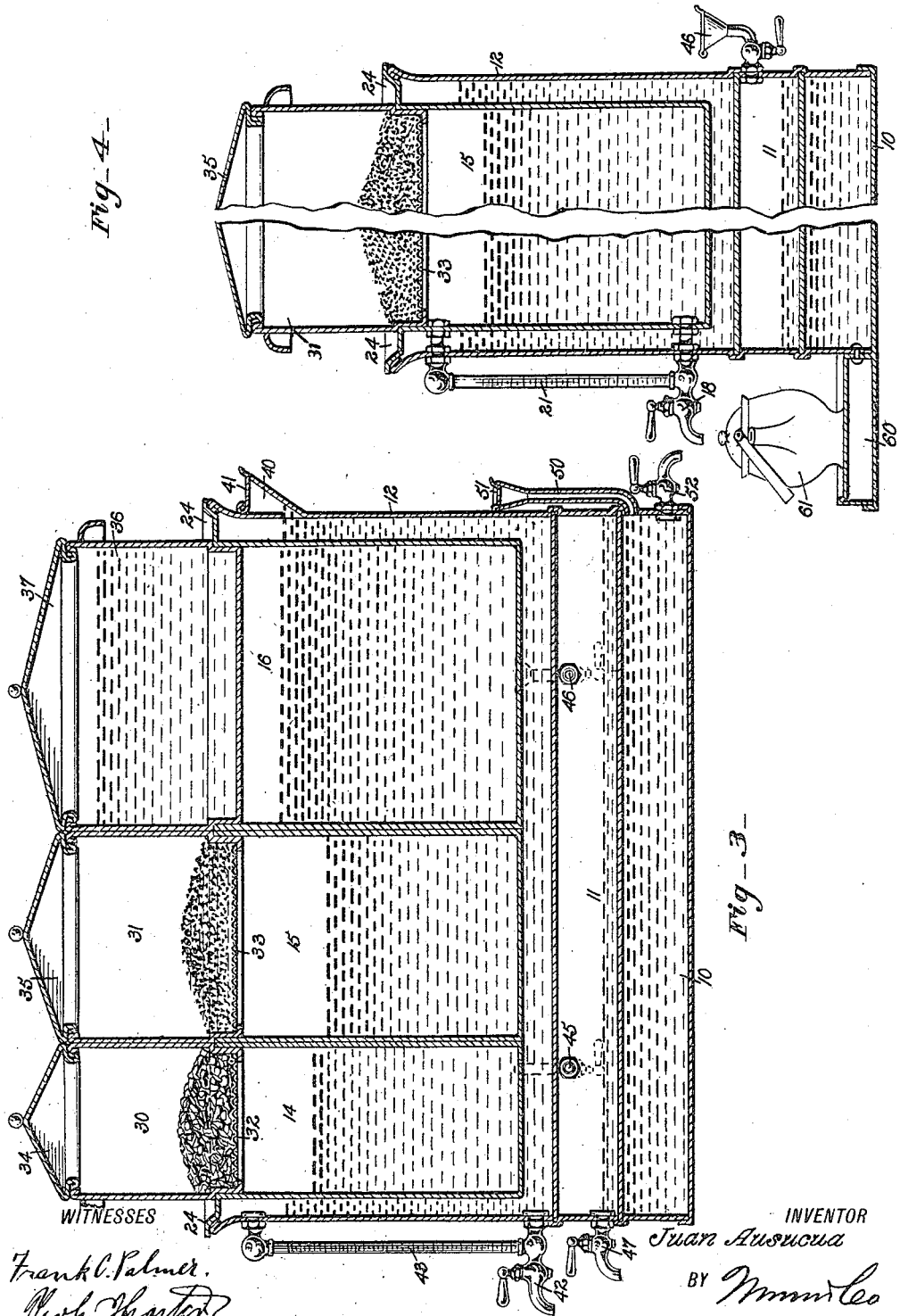

UNITED STATES PATENT OFFICE.

JUAN AUSUCUA, OF NEW YORK, N. Y.

COFFEE, TEA, AND MILK URN.

1,256,424.  Specification of Letters Patent.  Patented Feb. 12, 1918.

Application filed March 6, 1917. Serial No. 152,634.

*To all whom it may concern:*

Be it known that I, JUAN AUSUCUA, a subject of the King of Spain, and at present residing in the city of New York, borough of Manhattan, in the county and State of New York, have invented a new and Improved Coffee, Tea, and Milk Urn, of which the following is a full, clear, and exact description.

The object of the invention is to provide a new and improved coffee, tea and milk urn more especially designed for use in restaurants, hotels and other places serving coffee, tea, milk and similar beverages, and arranged to permit the attendant in charge to control the heating of the beverages to the minutest degree and without danger of overheating or causing the beverages to reach a boiling stage so injurious to the production of good coffee and tea to be served.

In order to accomplish the desired result use is made of a water boiler or water heating chamber adapted to be arranged over a source of heat, a tank containing a number of vessels adapted to be charged with different beverages to be heated, the vessels being spaced at their bottoms and sides from the bottoms and sides of the said tank to provide space for heating water in the tank, and a vapor generating chamber intermediate the top of the said water boiler and the bottom of the said tank. Use is also made of manually controlled means for controlling the admission of air in the said air or vapor chamber.

A practical embodiment of the invention is represented in the accompanying drawings forming a part of this specification, in which similar characters of reference indicate corresponding parts in all the views.

Figure 1 is a front elevation of the urn;

Fig. 2 is a plan view of the same;

Fig. 3 is a sectional side elevation of the same; and

Fig. 4 is a cross section of the same.

The coffee, tea and milk urn in its general construction consists of a water boiler or a heating chamber 10 adapted to be set over a suitable source of heat, a closable vapor generating chamber 11 arranged directly above the said water boiler, and a tank 12 located directly above the said chamber 11 and filled with water. In the tank 12 are held suspended a number of vessels, 14, 15 and 16, of which the vessel 14 is adapted to contain tea, the vessel 15 coffee and the vessel 16 milk, and the said vessels are provided with draw-off faucets 17, 18 and 19 extending through the side wall of the tank 12 to be readily controlled by the attendant in charge of the urn to permit such attendant to draw off tea, coffee or milk as demanded. Glass gages 20, 21 and 22 are connected at their lower ends with the vessels 17, 18 and 19, and at their upper ends with the upper portions of the vessels 14, 15 and 16 to indicate the level of the several beverages in the said vessels.

The upper ends of the vessels 14, 15 and 16 are provided with outwardly extending flanges 24 resting on the upper edge of the tank 12 to suspend the said vessels within the tank 12 in such a manner that the bottoms and sides of the vessels are spaced from the bottom and sides of the tank 12, as plainly indicated in Figs. 3 and 4. The upper open ends of the vessels 14 and 15 are adapted to be closed by percolators 30 and 31 provided at their bottoms with sieves or screens 32, 33 for supporting tea leaves and ground coffee for making tea and coffee by pouring water over said leaves and coffee grounds, the percolate passing into the vessels 14 and 15. The upper ends of the percolators 30 and 31 are adapted to be closed by removable covers 34 and 35. The upper open end of the vessel 16 is normally closed by an auxiliary milk-containing vessel 36 provided with a cover 37, thus permitting of storing an extra supply of milk which receives a preliminary heating prior to being poured into the vessel 16 in case the latter needs replenishing.

The tank 12 is adapted to be charged with water through a suitable inlet spout 40 normally closed by a hinged cover 41, and the tank 12 is also provided with a draw-off faucet 42 and a glass gage 43 indicating the level of the water in the tank 12. A thermometer 44 is also arranged on the tank 12 to indicate the temperature of the water contained therein. The closable vapor generating chamber 11 is provided with a number of air valves or faucets 45 which when open permit the circulation of air and vapor through the said chamber to permit the attendant to regulate the temperature of the vapor in the said chamber 11. The air valves 45 have their spouts turned upward, as plainly shown in Fig. 1. On the back of the chamber 11 is arranged a valve filling spout 46 for partly filling the said chamber 11 with water, and the said chamber 11 is provided with a draw-off faucet 47 for drawing off such water whenever it is desired to do so.

The water boiler or water heating chamber 10 is provided with a filling spout 50 normally closed at its upper end by a hinged cover 51, and the said boiler is also provided with a draw-off faucet 52 for drawing off boiling water from the said boiler for use in the percolators 30 and 31 in case it is deemed desirable to do so, that is, instead of heating water separately for use in the percolators 30 and 31. The water boiler 10 is provided with a suitable thermometer 53 to indicate the temperature of the water in the said boiler.

The water boiler 10 forms the base of the urn and is provided at the front with a shelf 60 for supporting teapots, coffee pots and milk pitchers and like vessels to be filled with tea, coffee or milk drawn from the vessels 14, 15 and 16 by the attendant opening the corresponding draw-off faucets 17, 18 and 19.

When the urn is in position over a source of heat, for instance, set on top of a gas stove, and the burners thereof are lighted then the water contained in the boiler 10 is heated and heat is radiated from the top of this boiler to heat the water contained in the chamber 11 to fill the upper portion thereof with vapor. The temperature of the vapor and water in the chamber 11 can be readily controlled by the attendant opening or closing the air inlets or throwing off some of the water. The heat from the vapor or air in the said chamber 11 heats the water in the tank 12 and this heated water in turn heats the several vessels 14, 15 and 16 and their contents. From the foregoing it will be seen that by the arrangement described the several beverages are heated to the desired degree without danger of overheating or causing the beverages to reach the boiling stage, it being well known that such boiling stage of tea, coffee or milk is injurious to the production of good tea, coffee or milk for use as beverages.

By the use of the chamber 11 intermediate the boiler 10 and the tank 12 the heating of the latter can be controlled to the minutest degree by the operator admitting air to the chamber 11, or drawing hot water therefrom or charging it with colder water.

Although I have shown and described the urn arranged with three vessels 14, 15 and 16 for containing tea, coffee and milk, it is evident that only one such vessel may be used for making a corresponding beverage.

Having thus described my invention, I claim as new and desire to secure by Letters Patent:—

1. An urn, comprising a water boiler adapted to be arranged over a source of heat, a tank containing a number of vessels adapted to be charged with different beverages to be heated, the vessels being spaced at the bottom and sides from the bottom and sides of the said tank to provide a space for heating water in the tank, and a closable vapor generating chamber intermediate the top of the said water boiler and the bottom of the said tank.

2. An urn, comprising a water boiler adapted to be arranged over a source of heat, a tank containing a number of vessels adapted to be charged with different beverages to be heated, the vessels being spaced at the bottom and sides from the bottom and sides of the said tank to provide a space for heating water in the tank, a closable vapor generating chamber intermediate the top of the said water boiler and the bottom of the said tank, and manually controlled valves connected with the said vapor generating chamber to permit of controlling the temperature of the vapor in the said vapor chamber.

3. An urn, comprising a water boiler adapted to be arranged over a source of heat, a tank containing a number of vessels adapted to be charged with different beverages to be heated, the vessels being spaced at the bottom and sides from the bottom and sides of the said tank to provide a space for heating water in the tank, the said vessels for containing the aforesaid beverages then being normally closed at the top by removable percolators having perforate bottoms and removable tops, and a closable vapor generating chamber intermediate the top of the said water boiler and the bottom of the said tank.

4. An urn, comprising a water boiler adapted to be arranged over a source of heat, a tank containing a number of vessels adapted to be charged with coffee and tea and milk to be heated, the vessels being spaced at the bottom and sides from the bottom and sides of the said tank to provide a space for heating water in the tank, the said vessels for containing the coffee and tea then being normally closed at the top by removable percolators having perforate bottoms and removable tops and the said vessel for containing milk being normally closed at the top by a removable auxiliary milk container, and a closable vapor generating chamber intermediate the top of the said water boiler and the bottom of the said tank.

5. An urn, comprising a water boiler adapted to be arranged over a source of heat, a tank containing a number of vessels adapted to be charged with different beverages to be heated, the vessels being spaced at the bottom and sides from the bottom and sides of the said tank to provide a space for heating water in the tank, draw-off faucets for the said vessels and extending through the front of the tank to the outside of the latter to allow of drawing off individual beverages from the vessels as required, and a closable vapor generating chamber intermediate the top of the said water boiler and the bottom of the said tank.

6. An urn, comprising a water boiler adapted to be arranged over a source of heat, a tank, a vessel in the tank and spaced from the sides and bottom of the tank to form a space for heating water in the tank, the vessel being adapted to be charged with a beverage, means for drawing off the beverage from the vessel as required, a closable vapor generating chamber intermediate the top of the said water boiler and the bottom of the said vessel, and manually controlled means for controlling the temperature of the air or vapor in the said vapor chamber, said means including upwardly opening spouts and valves controlling the same.

JUAN AUSUCUA.

Copies of this patent may be obtained for five cents each, by addressing the "Commissioner of Patents, Washington, D. C."